United States Patent
Lacson et al.

(10) Patent No.: US 10,134,424 B2
(45) Date of Patent: Nov. 20, 2018

(54) WEARABLE WORD COUNTER

(71) Applicant: VersaMe, Inc., Portola Valley, CA (US)

(72) Inventors: Alvin Lacson, Palo Alto, CA (US); Jill Desmond, Cornelius, NC (US); Andy Turk, Oakland, CA (US)

(73) Assignee: Versame, Inc., Portola Valley, CA (US)

( * ) Notice: Subject to any disclaimer, the term of this patent is extended or adjusted under 35 U.S.C. 154(b) by 56 days.

(21) Appl. No.: 15/191,688

(22) Filed: Jun. 24, 2016

(65) Prior Publication Data

US 2016/0379671 A1 Dec. 29, 2016

Related U.S. Application Data

(60) Provisional application No. 62/184,291, filed on Jun. 25, 2015.

(51) Int. Cl.

| | |
|---|---|
| *G10L 15/04* | (2013.01) |
| *G10L 15/00* | (2013.01) |
| *G10L 25/72* | (2013.01) |
| *G10L 25/48* | (2013.01) |
| *G09B 5/00* | (2006.01) |
| *G09B 21/00* | (2006.01) |
| *G10L 15/02* | (2006.01) |

(52) U.S. Cl.
CPC ............... *G10L 25/72* (2013.01); *G09B 5/00* (2013.01); *G09B 21/00* (2013.01); *G10L 25/48* (2013.01); *G10L 2015/027* (2013.01)

(58) Field of Classification Search
None
See application file for complete search history.

(56) References Cited

U.S. PATENT DOCUMENTS

| | | | | |
|---|---|---|---|---|
| 6,185,527 B1 * | 2/2001 | Petkovic | ........... | G06F 17/30746 704/231 |
| 6,208,970 B1 * | 3/2001 | Ramanan | ................ | G10L 17/26 379/88.19 |
| 6,990,445 B2 * | 1/2006 | Ky | ........................ | G10L 15/04 704/231 |

(Continued)

FOREIGN PATENT DOCUMENTS

DE 10212128 A1 10/2003

OTHER PUBLICATIONS

Betty Hart & Todd R. Risley, Meaningful Differences in the Everyday Experiences of Young American Children (pp. vii, 21-49, 58-59, 64-67, 72-75, 132-133, 234-235, 238-241), 1995, Paul H. Brookes Publishing Co, Baltimore, MD.

*Primary Examiner* — Satwant Singh
(74) *Attorney, Agent, or Firm* — Travis R. Banta; TechLaw Ventures, PLLC

(57) ABSTRACT

This disclosure generally relates to a portable device. Specifically, this disclosure generally relates to a portable word counter device. The portable word counter device includes a digital microcontroller circuit. The digital microcontroller circuit includes a syllable detector detecting syllables in spoken speech. The syllable detector aggregates a number of detected syllables and applies a syllable to word counted ratio. Based on the syllable to word counted ratio, the syllable detector determines a number of words spoken, and transmits the number of words spoken to a mobile device.

11 Claims, 1 Drawing Sheet

(56) References Cited

U.S. PATENT DOCUMENTS

| | | | | |
|---|---|---|---|---|
| 8,976,941 B2* | 3/2015 | Kim | ............... | G10L 15/01 |
| | | | | 379/88.01 |
| 9,190,060 B2* | 11/2015 | Nonaka | ............... | G10L 15/22 |
| 9,390,709 B2* | 7/2016 | Nonaka | ............... | G10L 15/10 |
| 9,530,401 B2* | 12/2016 | Kim | ............... | G10L 15/01 |
| 9,548,046 B1* | 1/2017 | Boggiano | ............... | G10L 15/05 |
| 2002/0169583 A1 | 11/2002 | Gutta | | |
| 2003/0220788 A1* | 11/2003 | Ky | ............... | G10L 15/04 |
| | | | | 704/235 |
| 2007/0185704 A1* | 8/2007 | Yoshimura | ............... | G10L 17/26 |
| | | | | 704/10 |
| 2009/0043581 A1* | 2/2009 | Abbott | ............... | G10L 15/187 |
| | | | | 704/254 |
| 2010/0217591 A1* | 8/2010 | Shpigel | ............... | G10L 15/32 |
| | | | | 704/235 |
| 2013/0322215 A1* | 12/2013 | Du | ............... | G10L 25/78 |
| | | | | 367/136 |
| 2014/0244255 A1* | 8/2014 | Nonaka | ............... | G10L 15/08 |
| | | | | 704/244 |

\* cited by examiner

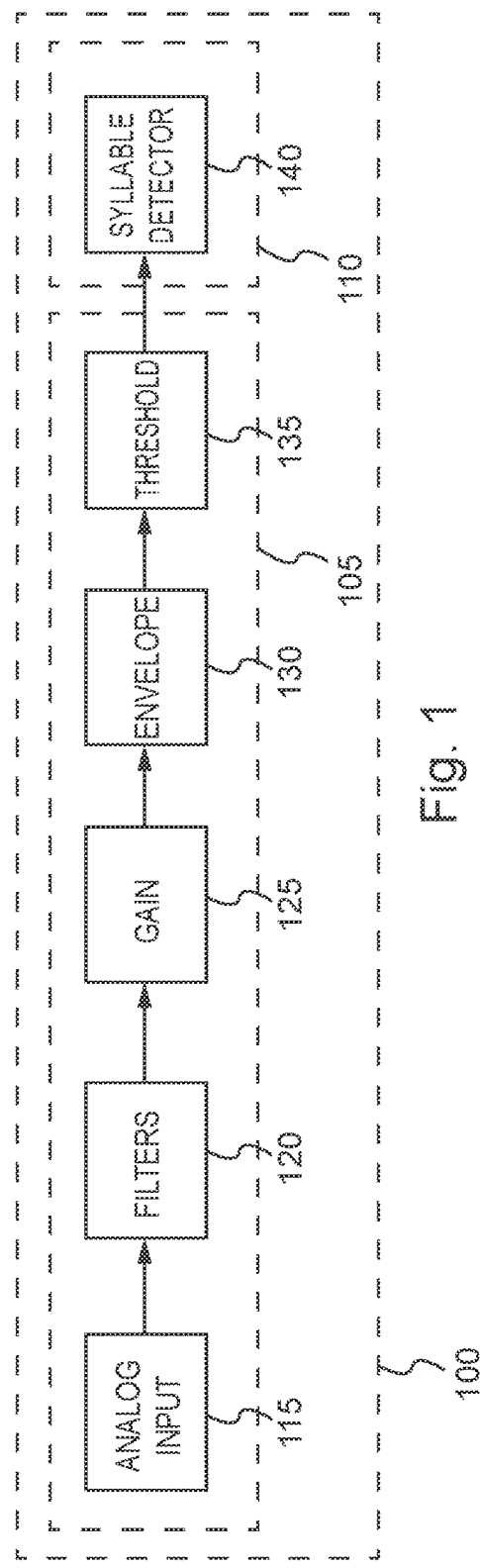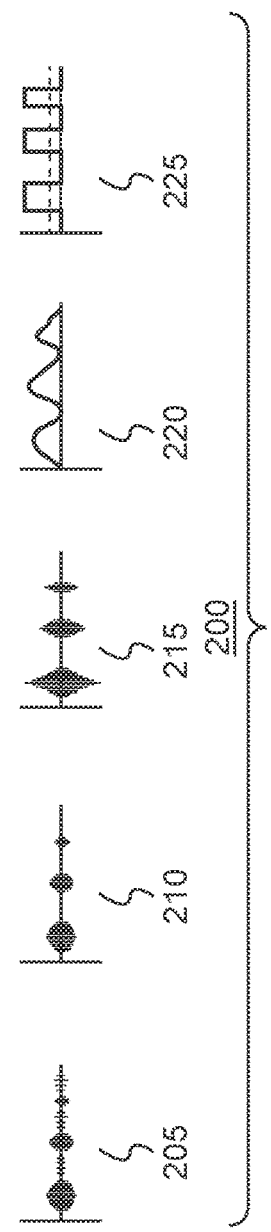

WEARABLE WORD COUNTER

BACKGROUND

1. Technical Field

This disclosure relates generally to a wearable device. More specifically, the device disclosed herein relates to a device that may be worn by a user to count a number of words heard by or spoken to the user over a period of time.

2. Description of the Related Art

Child rearing and development is often one of the most daunting tasks that new parents face. However, many parents simply lack the knowledge and tools to objectively track a child's development in the child's early years when brain development is most rapid. Moreover, recent studies have shown a correlation between brain development in young children and the degree of interaction they have with parents and others. Specifically, a high degree of correlation exists between the quantity of words spoken to a baby and brain development in children younger than three years old. Given that the number of words spoken to a baby predicts a baby's intelligence and that a person's intelligence stabilizes for life by pre-school, the number of words spoken to a child between birth and age three largely sets the child's mental ability trajectory for the child's lifetime.

In order to track the number of words spoken to children for these studies, researchers used cassette tapes or digital speech recorders to record conversations in the homes of young children. Once the recordings were completed, researchers tediously transcribed the recordings and manually counted each word heard by or spoken to a young child. This method of counting words spoken to a child is profoundly inefficient in terms of effort and time effectiveness. While these technologies made it possible to manually count the words spoken to a child they are inadequate to do any more than make a recording of conversations for later transcription. Other more rudimentary methods for counting the number of words heard by or spoken to a child have also included an observer manually counting words as the words are spoken to a child.

One difficulty in monitoring the number of words spoken to a child is that between birth and three years of age, most children become ambulatory and move away from, and out of recording range of, conventional stationary recording devices. However, with the advent of wearable devices, also known as "wearables," mobile processing power has been substantially increased allowing previously stationary devices to become portable. As processing power per unit of physical space has increased, wearables have gained in popularity with the general public by incorporating processing power into articles of clothing or devices that attach to the head, hands, feet, arms, legs, or other body parts of their users. Several examples of wearable devices include a calculator wristwatch, eye glasses that incorporate heads-up displays, ear muffs or hats that incorporate head phones or ear buds, smart watches, smart headbands, smart pedometers, and a host of other implementations that provide various users with desired information or entertainment. Many wearable devices have been implemented as health care or health monitoring devices and are used to monitor heart rate, blood pressure, physical activity levels, body temperature, and other physical indications for the ill and for high performance athletes.

It is therefore one object of this disclosure to provide a wearable device that counts the number of words spoken to or heard by a user in real-time. Another object of this disclosure is to provide a wearable word counting device to count the number of words spoken to or heard by a user and transmit a real-time word count to another device. Another object of this disclosure is to provide a wearable device that streams information to a remote device with greater processing power. Another object of this disclosure is to provide a wearable device capable of performing speech analysis in a low-power environment.

SUMMARY

Consistent with embodiments disclosed herein, a portable word counter device is disclosed. The portable word counter device includes a digital microcontroller circuit. The digital microcontroller circuit includes a syllable detector detecting syllables in spoken speech. The syllable detector aggregates a number of detected syllables and applies a syllable to word counted ratio. Based on the syllable to word counted ratio, the syllable detector determines a number of words spoken, and transmits the number of words spoken to a mobile device.

Also disclosed herein is a portable word counter system. The portable word counter system includes an analog low power circuit, a digital microcontroller circuit, and a mobile device. The analog low power circuit includes an analog input receiver, one or more linear analog filters, a gain amplifier stage, an envelope detector, and a threshold detector. The digital microcontroller circuit includes a syllable detector.

BRIEF DESCRIPTION OF THE DRAWINGS

The accompanying drawings illustrate an embodiment of a wearable word counter.

FIG. 1 illustrates a block circuit diagram of the wearable word counter.

FIG. 2 illustrates a series of waveforms representative of various stages of the block circuit diagram illustrated in FIG. 1.

DETAILED DESCRIPTION OF PREFERRED EMBODIMENTS

In the following description, for purposes of explanation and not limitation, specific techniques and embodiments are set forth, such as particular techniques and configurations, in order to provide a thorough understanding of the device disclosed herein. While the techniques and embodiments will primarily be described in context with the accompanying drawings, those skilled in the art will further appreciate that the techniques and embodiments may also be practiced in other similar devices.

Reference will now be made in detail to the exemplary embodiments, examples of which are illustrated in the accompanying drawings. Wherever possible, the same reference numbers are used throughout the drawings to refer to the same or like parts. It is further noted that elements disclosed with respect to particular embodiments are not restricted to only those embodiments in which they are described. For example, an element described in reference to one embodiment or FIGURE, may be alternatively included in another embodiment or FIGURE regardless of whether or not those elements are shown or described in another embodiment or FIGURE. In other words, elements in the FIGURES may be interchangeable between various embodiments disclosed herein, whether shown or not.

FIG. 1 illustrates a block circuit diagram of wearable word counter 100. Wearable word counter 100 includes an analog low power circuit 105 that is coupled to a digital microcontroller circuit 110. In one embodiment, wearable word counter 100 includes a battery, not shown, which supplies power to both analog low power circuit 105 and digital microcontroller circuit 110. During use, the battery within wearable word counter 100 supplies power sufficient for analog low power circuit 105 and digital microcontroller circuit 110 to operate for an extended time period. For example, in one mode of operation, the battery within wearable word counter 100 supplies sufficient power for wearable word counter 100 to operate for a period of up to a week. The battery within wearable word counter 100 may be a rechargeable battery, allowing the battery within wearable word counter 100 to be recharged during periods of non-use.

In use, wearable word counter 100 is portable. For example, wearable word counter 100 may be attached to a user, such as a child, or, alternatively, attached to the user's clothing. Thus, in one embodiment, wearable word counter 100 may be attached to the user or the user's clothing in a way that does not restrict the ability of the user to move or play. Wearable word counter 100 may further be positioned on the user or user's clothing such that it may be unobstructed to the aural environment of the user to whom it is attached. Wearable word counter 100 may move with the user as the user travels in a physical environment. In one embodiment, wearable word counter 100 may be removed when the user sleeps because a user is generally not perceptive of sounds during sleep.

Because wearable word counter 100 is portable and powered by a battery, it is advantageous that battery power consumed by wearable word counter 100 is minimized. Accordingly, wearable word counter 100 reduces power consumption by implementing analog low power circuit 105. Analog low power circuit 105 consumes far less battery power than other technologies, such as a digital signal processor, and others, while providing sufficient functionality to detect individual words spoken to a user of wearable word counter 100. Thus, at least one advantage of wearable word counter 100 is that analog low power circuit 105 consumes very little battery power. In general, a physical size of a battery is proportional to the amount of electrical voltage and electrical current produced by the battery. Accordingly, because wearable word counter 100 utilizes analog low power circuit 105, the physical size of wearable word counter 100 may be substantially smaller than a similar device that utilizes digital signal processing technology. A smaller physical size for wearable word counter 100 is less cumbersome to a user, interferes less with the user's movement, and is lighter allowing the user to bear the weight of wearable word counter 100 more easily. Wearable word counter 100 may be implemented with each of the elements shown in FIG. 1 in a single housing.

Analog low power circuit 105 within wearable word counter 100 includes an analog input receiver 115, linear analog filters 120, a gain amplifier stage 125, an envelope detector 130, and a threshold detector 135. FIG. 2 shows a series of waveforms 200 that are used herein to explain the elements of analog low power circuit 105.

For example, analog input receiver 115 may be implemented as a microphone installed within wearable word counter 100 that receives analog input, such as a speech signal. In this embodiment, the microphone within analog input receiver 115 may be positioned within wearable word counter 100 in such a way as to be relatively unobstructed from the user's aural environment. That is to say, the microphone may be positioned within wearable word counter 100 such that the microphone will detect any spoken words that would be heard by the user, for example. Audio input waveform 205 shows a representation of three syllables spoken by, for example, a parent to a small child as detected by a microphone within analog input receiver 115 shown in FIG. 1.

After analog input receiver 115 receives analog input, one or more linear analog filters 120 remove undesirable portions of the analog input signal. Although referred to in the plural, linear analog filters 120 may be implemented as a single filter or in combinations of various filters. Linear analog filters 120 may be implemented as low pass filters, high pass filters, all pass filters, band pass filters, band reject filters, and any other type of analog filter. Linear analog filters 120 may, for example, be implemented to remove portions of the analog input that fall outside the hearing ability of a human being. For example, linear analog filters may filter out any portions of analog input above 20 kHz, leaving the portion of the analog input between 0 Hz and 20 kHz. Linear analog filters 120 may be implemented in such a way as to remove noise from the analog input. Linear analog filters 120 may be further implemented in such a way as to remove portions of the analog input that would be inconsistent with human speech. For example, the frequency range of voiced speech typically occurs in the range of 100 Hz to 3 kHz. Linear analog filters 120 may be implemented to remove any portion of the analog input that falls outside the range of 100 Hz to 3 kHz, for example. Any particular implementation of linear analog filters 120 may be implemented to meet any desirable range of analog input received by analog input receiver 115. Filtered audio input waveform 210 of FIG. 2 shows the same three syllables that are shown in audio input waveform 205 after those words have been subjected to filtering via linear analog filters 120.

Once filtering is complete, a filtered signal is produced by linear analog filters 120 and is provided to gain amplifier stage 125. Gain amplifier stage 125 is used to amplify and enhance the filtered signal. Amplifying the filtered signal increases the amplitude of the filtered signal and makes the filtered signal large enough to measure or compare to a threshold, as will be discussed below. For example, amplified filtered waveform 215 shown in FIG. 2 shows clearly three distinct syllables that were received as analog input, filtered by the linear analog filters 120, and amplified in gain amplifier stage 125. This amplified signal is provided to envelope detector 130.

Envelope detector 130 operates as a waveform smoothing function on the amplified signal provided to envelope detector 130. Generally, a capacitor is slowly charged and discharged by the amplified signal, which produces a waveform similar to that shown as envelope waveform 220, shown in FIG. 2. Thus, envelope detector 130 removes each frequency spike of the original analog input in favor of providing a smoothed waveform representative of the three syllables originally spoken to the user of wearable word counter 100. Envelope detector 130 provides this smoothed signal to threshold detector 135. The term "smooth waveform" or "smoothed waveform" means a waveform substantially free from frequency spikes. One example of a smoothed waveform is shown as envelope waveform 220, shown in FIG. 2.

Threshold detector 135 applies a threshold level to the smoothed signal to determine what portions of the analog input do and do not correspond to a spoken syllable. In one embodiment, threshold detector 135 may be implemented as a voltage detector or a current detector implemented as voltage comparators. Other types of threshold detectors are possible. In practice, threshold detector 135 detects any portion of the smoothed signal generated by envelope detector 130 that exceeds a particular amplitude (current or voltage). As shown in FIG. 2, threshold waveform 225 denotes that the smoothed signal shown in envelope waveform 220 exceeds the threshold amplitude in three portions of threshold waveform 225. Threshold detector 135 converts the smoothed signal into a square wave, showing the three syllables spoken to the user and eliminating any portion of the smoothed signal that does not meet or exceed the particular amplitude determined to correspond to a syllable of speech. The square wave is provided by threshold detector 135 to syllable detector 140.

Syllable detector 140 is implemented by a processor in digital microcontroller circuit 110. The processor in digital microcontroller circuit 110 within wearable word counter 100 can include a combination of one or more application programs and one or more hardware components. For example, application programs may include software modules, sequences of instructions, routines, data structures, display interfaces, and other types of structures that execute operation. Further, hardware components may include a combination of processors, microcontrollers, busses, volatile and non-volatile memory devices, non-transitory computer readable memory device and media, data processors, control devices, transmitters, receivers, antennas, transceivers, input devices, output devices, network interface devices, and other types of components that are apparent to those skilled in the art.

Syllable detector 140 receives the square wave from threshold detector 135 and compares the square wave received from threshold detector 135 against a square wave duration threshold. Any square wave with a duration less than a minimum time duration threshold is discarded. Similarly, any square wave with a duration greater than a maximum time duration threshold is also discarded. Any square wave with a duration greater than the minimum time duration threshold and less than the maximum time duration threshold is representative of a syllable spoken to a user of wearable word counter 100. Accordingly, syllable detector 140 aggregates the number of syllables spoken to the user. Typically, adults speak to babies using monosyllabic words. Thus, the syllable to counted word ratio spoken to a baby may be approximately 1:1. However, as a child grows, adult speech directed to the child gains complexity, using both monosyllabic and polysyllabic words. Thus, as a baby grows into a child, the number of syllables per individual word spoken to the child increases. Accordingly, syllable detector 140 may monitor the age of the user and adjust the syllable to counted word ratio to count the number of words spoken to the user of wearable word counter 100 as a child grows from infancy.

For example, adults speaking to babies may not use complete sentences. An adult speaking to a baby may point to a dog and say "dog, dog, dog" while an adult speaking to a toddler may point to a dog and say "do you see the furry puppy?" In such a case, the adult's speech directed to a toddler is substantially more complex than the adult's speech directed to the baby. Accordingly, wearable word counter 100 may adjust the counting of words to account for more complex speech by adjusting the syllable to counted word ratio. For a baby younger than 6 months old, in one hypothetical example, wearable word counter 100 may use a syllable to counted word ratio of one syllable to one counted word (i.e., one syllable is counted as one word). For a baby older than 6 months, in another hypothetical example, wearable word counter 100 may use a syllable to counted word ratio of 1.5 syllables to one counted word (i.e., for every 1.5 counted syllables, one word is counted). For babies older than a year, in another hypothetical example, wearable word counter 100 may use a syllable to counted word ratio of 2 syllables to one counted word (i.e., for every 2 counted syllables, one word is counted). Syllable detector 140 may adjust this syllable to counted word ratio based on the age of the user of wearable word counter 100.

Syllable detector 140 constantly monitors speech directed to the user of wearable word counter 100 and counts the syllables detected. Once syllable detector 140 applies the syllable to counted word ratio, a number of words spoken to the user is determined. In one embodiment, this number of words spoken to the user may be transmitted by wearable word counter 100 to a mobile device. Any mobile device may be suitable for receiving information from wearable word counter 100. Conventional mobile devices include devices that are capable of running a software application, such as a smart phone, a tablet, a personal computer, a desktop computer, a music storage and playback device, a personal digital assistant, or any other device capable of implementing a software application.

In one embodiment, digital microcontroller circuit 110 (and/or syllable detector 140) may automatically adjust an amplification and a threshold level for received audio input based on ambient noise in a particular aural environment. For example, in a noisy room, digital microcontroller circuit 110 may sample the aural environment to determine a "noise floor" for that environment. The noise floor may also be referred to as ambient noise. During speech, the ambient noise is increased. In order to recognize speech in relatively noisy aural environments, digital microcontroller circuit 110 may adjust the amplification and threshold levels discussed above such that only speech directed to the user of wearable word counter 100 meets or exceeds the adjusted threshold level. This automatic adjustment ensures that the syllable count remains accurate because ambient noise falls short of meeting an automatically set threshold for a particular aural environment. Thus, ambient noise is not reflected in the syllable count.

In another embodiment, wearable word counter 100 may transmit information to one or both of a mobile device and a non-mobile device. For example, wearable word counter 100 may be provided with a docking station designed to remain tethered to a non-mobile power supply. The docking station may operate using alternating current power supplied from an electrical outlet in, for example, a home. In one embodiment, the docking station may be configured to recharge the battery or batteries within wearable word counter 100 when the docking station is connected to wearable word counter 100. The docking station may receive information from wearable word counter 100 wirelessly, through a wired connection, and/or through a corresponding male and female connector disposed within wearable word counter 100 and the docking station. The docking station may have a separate ability to connect to a mobile device, a server, a cloud computer, or any other device using a wired or wireless connection to provide information received from wearable word counter 100 to other devices. The mobile device may display information, including word count information, received from wearable word counter 100. The docking station may further implement any functionality of the mobile device described herein.

In one embodiment, wearable word counter 100 may connect to the mobile device or to the non-mobile device using a wireless communication connection. For example, a wireless communication connection may be implemented using a Bluetooth wireless communication link. Numerous other types of communication links may also be implemented including Wi-Fi, ZigBee, Z-Wave, RF4CE, Ethernet, telephone line, cellular channels, or others that operate in accordance with protocols defined in IEEE (Institute of Electrical and Electronics Engineers) 802.11, 801.11a, 801.11b, 801.11e, 802.11g, 802.11h, 802.11i, 802.11n, 802.16, 802.16d, 802.16e, or 802.16m using any network type including a wide-area network ("WAN"), a local-area network ("LAN"), a 2G network, a 3G network, a 4G network, a Worldwide Interoperability for Microwave Access (WiMAX) network, a Long Term Evolution (LTE) network, Code-Division Multiple Access (CDMA) network, Wideband CDMA (WCDMA) network, any type of satellite or cellular network, or any other appropriate protocol to facilitate communication between wearable word counter 100 and the mobile device.

In one embodiment, the mobile device may be used to interface with wearable word counter 100. For example, in addition to receiving a real-time transmission of the number of words spoken to a user of wearable word counter 100, the mobile device may additionally allow another user, such as a parent of a child wearing wearable word counter 100, to make adjustments in the settings of wearable word counter 100. For example, the parent may manually adjust the syllable to counted word ratio to more accurately reflect the level of speech complexity heard by the child for a particular duration of time. For example, a parent may use a mobile device to adjust the syllable to counted word ratio down if a toddler were to experience a play date with other toddlers for the duration of the playdate (because other toddlers will use less complex speech to interact with other toddlers). In another embodiment, the mobile device recommends a particular syllable to counted word ratio to be implemented by wearable word counter 100 during a particular time.

One benefit of connecting wearable word counter 100 to a mobile device is accessing the enhanced processing power of the mobile device. Mobile devices typically have much more advanced processing capabilities than wearable word counter 100, which allows for more complex analysis of speech and speech patterns. Accordingly, wearable word counter 100 may, in addition to counting the number of words spoken to a child, stream the analog input to the mobile device for more complex analysis in a compressed or uncompressed format. In one embodiment, wearable word counter 100 may apply initial filtering and amplification to the analog input with linear analog filters 120 and gain amplifier stage 125 before streaming a filtered and amplified representation of the analog input to the mobile device. In another embodiment, wearable word counter 100 may intermittently stream the analog input at different times during use in order to provide the mobile device of an averaged sample of the analog input. In one embodiment, wearable word counter 100 records analog input and transmits the analog input as an analog signal to the mobile device via the wireless communication connection.

In another embodiment, the mobile device records an analog signal representative of voiced speech directed to a user of wearable word counter 100 provided over the wireless communication connection by wearable word counter 100. The mobile device may transmit the recorded analog signal to a server or to a cloud computer for more advanced speech processing or perform speech analysis in the mobile device. In another embodiment, wearable word counter 100 may stream an analog signal representative of voiced speech directed to a user of wearable word counter 100 over a wireless communication connection directly to a cloud computer, without transmitting the analog signal through the mobile device. In these ways, more complex analysis of the speech heard by or spoken to the user may be performed. This more complex analysis may provide a mobile phone user (or a cloud computer user) with information such as the number of times a user of wearable word counter 100 has heard a particular word or identify commonly used conversational terms, identify the language or languages spoken to the user of wearable word counter 100, and other similar analysis. The mobile device may also update the firmware within wearable word counter 100 via the wireless communication connection between the mobile device and wearable word counter 100.

Finally, wearable word counter 100 may further include a light sensor and an accelerometer. In one embodiment, wearable word counter 100 may determine, via a light sensor, that the user is watching television based on the flickering light emitted by the television. Wearable word counter 100 may exclude words that are detected during periods when the light sensor detects the flickering light emitted by a television. In one embodiment, a light sensor may further be used to detect an ambient light level in the environment around wearable word counter 100. Wearable word counter 100 may determine that a certain level of light, or lack thereof, indicates that the user of wearable word counter 100 may be asleep or going to sleep. Accordingly, wearable word counter 100 may determine, based on the detected ambient level of light, that no words are likely to be spoken to the user and enter an off state or a power stand-by state or discontinue streaming audio information in order to save battery power. In another embodiment, wearable word counter 100 may infer a state of a user based on the user's movement, as detected by the accelerometer. If the user is moving, for example, wearable word counter 100 may stream audio to the mobile device. However, if the user is not moving, as detected by the accelerometer, wearable word counter 100 may infer that the user is asleep and stop the streaming audio information until the user awakes. Wearable word counter may also enter an off state or a power stand-by state in order to save battery power during periods when the user's movements are less frequent or reduced.

The foregoing description has been presented for purposes of illustration. It is not exhaustive and does not limit the invention to the precise forms or embodiments disclosed. Modifications and adaptations will be apparent to those skilled in the art from consideration of the specification and practice of the disclosed embodiments. For example, components described herein may be removed and other components added without departing from the scope or spirit of the embodiments disclosed herein or the appended claims.

Other embodiments will be apparent to those skilled in the art from consideration of the specification and practice of the disclosure disclosed herein. It is intended that the specification and examples be considered as exemplary only, with a true scope and spirit of the invention being indicated by the following claims.

What is claimed is:

1. A portable word counter system, comprising:
   an analog low power circuit, comprising:
   an analog input receiver receiving input representative of human speech and transforming the input representative of human speech into a signal,
   one or more linear analog filters filtering the signal into one or more frequency bands,
   a gain amplifier stage amplifying the one or more frequency bands,
   an envelope detector removing frequency spikes from the amplified one or more frequency bands, and a threshold detector detecting whether or not a voltage or current of the amplified one or more frequency bands exceeds a threshold voltage or current; and;
a digital microcontroller circuit, comprising:
a syllable detector detecting each instance in which the threshold detector detects that the threshold voltage or current is exceeded in the one or more frequency bands as a threshold detection,
wherein the digital microcontroller circuit identifies the threshold detection as a spoken syllable and determines a word count for the number of words received in the input representative of human speech.

2. The portable word counter system of claim 1, wherein the analog input receiver includes a microphone that receives the input representative of human speech.

3. The portable word counter system of claim 2, wherein the one or more linear analog filters remove any portion of the input representative of human speech greater than 100 kHz.

4. The portable word counter system of claim 2, wherein the one or more linear analog filters remove any portion of the input representative of human speech that falls outside the range of 100 Hz to 3 kHz.

5. The portable word counter system of claim 1, wherein the envelope detector includes a capacitor that removes the frequency spikes from the portion of analog input representative of human speech that are less than 20 kHz and that transforms the analog input into a smoothed waveform.

6. The portable word counter system of claim 5, wherein the threshold detector includes a voltage comparator.

7. The portable word counter system of claim 5, wherein the threshold detector further compares at least one of a current and a voltage of the smoothed waveform to at least one of a threshold current and a threshold voltage.

8. The portable word counter system of claim 7, wherein the threshold detector further generates a threshold detection waveform representative of each instance where the at least one of the current and the voltage of the smoothed waveform exceeds the at least one of the threshold current and the threshold voltage.

9. The portable word counter system of claim 8, wherein the syllable detector further aggregates the number of threshold detection waveforms generated by the threshold detector and applies a syllable to word counted ratio to determine the number of words received in the input representative of human speech.

10. The portable word counter system of claim 9, wherein the portable word counter system transmits the determined word count to a mobile device.

11. The portable word counter of claim 10, wherein the mobile device displays the word count transmitted by the portable word counter system to the mobile device in real-time.

* * * * *